E. V. MYERS.
AUTOMOBILE BRAKE.
APPLICATION FILED JUNE 16, 1916.

1,372,769.  Patented Mar. 29, 1921.

Inventor
Eugene V. Myers,
By his Attorneys,

UNITED STATES PATENT OFFICE.

EUGENE V. MYERS, OF EAST ORANGE, NEW JERSEY.

AUTOMOBILE-BRAKE.

1,372,769.  Specification of Letters Patent.  Patented Mar. 29, 1921.

Application filed June 16, 1916. Serial No. 103,941.

*To all whom it may concern:*

Be it known that I, EUGENE V. MYERS, a citizen of the United States of America, residing in East Orange, in the county of Essex and State of New Jersey, have invented certain new and useful Improvements in Automobile-Brakes, of which the following is a specification.

This invention relates to automobile brakes and aims to provide certain improvements therein.

In the common form of automobile brake a drum is used upon the wheel or in some cases in the transmission or engine shaft, and a band is provided which either surrounds the drum or is placed within it. Usually a single drum is provided and one band is used for the foot brake and the other band for the emergency brake. These bands are necessarily subjected to severe usage, with the result that they speedily wear and require frequent adjustment. A very large proportion of the accidents in motor cars is occasioned by the fact that the brake bands are worn to a point where they cannot apply sufficient force to stop the car. This is oftentimes not discernible to the average user since in ordinary use in making stops the driver throws out his clutch and allows the car to "drift" to its stopping place, the brake being used to a slight degree. When an emergency arises, however, and it is necessary to stop the car quickly, the brakes are not capable of responding to the extraordinary demand which is made upon them.

According to the present invention I provide an automobile brake in which these disadvantages are largely if not fully avoided. In the simplest form of the invention I provide a structure which is capable of normal use until a certain point in the wear of the band or drum is reached, whereupon (preferably by a further movement of the same lever in the same direction) the mechanism acts to take up the brake band with greatly increased rapidity so that a short or limited movement of the brake lever is capable of producing such a rapid contraction or expansion of the brake band that the brakes are surely and efficiently applied.

Referring to the drawings which illustrate several forms of the invention,—

Figure 1:
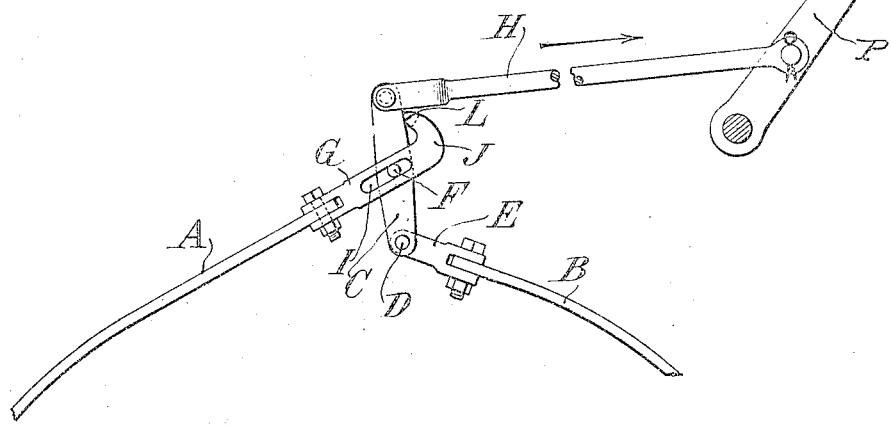
Figure 1 is an elevation of one form of my invention as applied to a contracting brake.

Referring first to Fig. 1 which shows the simplest form of the invention, let A and B indicate the two ends of a brake band of the contracting type such as is used on the exterior of a brake drum. The latter is not illustrated since its construction is common and it being understood that the band encircles the drum. In the operation of contracting the band, in a great majority of instances a lever C is employed. This lever may be of various forms but for clearness of illustration I have shown it in its simplest form wherein the lever is straight. It is pivoted at D to the end B, usually through the medium of a link E. It is pivoted at F to the end A, usually through the medium of a link G. The lever C is customarily operated by a rod H which leads either to the foot brake or the hand brake P, as shown, it being understood that when the rod is pulled in the direction of the arrow the band is contracted.

In the construction shown the pivot F, instead of working in a hole in the link G, works in a slot I; and the link G, instead of being straight, is provided with an upward extension or arm J.

Figure 4:
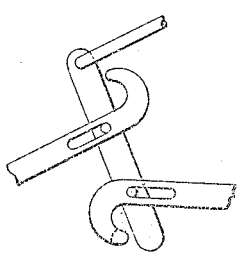
Fig. 4 is a view of a modification.

Fig. 1 shows the position of the parts when moved slightly beyond the end of the normal braking movement. During this normal braking movement the lever has been operating between the two points D and F, one of which as D, may be considered the fulcrum, and the other of which as F, may be considered the point of application of the load. Just prior to the time at which the parts reach the position of Fig. 1 however, the point of application of the load is changed from the point F to the point L, due to the contact of the end of the arm J with the lever C, with the result that a given movement of the lever will contract the band much more rapidly than the same movement of the lever before the contact is made. The added rapidity will depend principally upon the relative distances between the points D and F and the points D and L. After the lever contacts with the arm the pivot F rides in the slot I, thereby permitting the more rapid contraction of the band, If desired, the link E may be constructed similarly to link G, with its arm on the opposite side of the lever C as shown in Fig. 4.

Normally, the brakes will be adjusted so that the foot lever will require let us say from one-half to three-quarters of its total movement to set the brakes, this movement depending upon whether the brake band is tight or loose. When the band becomes worn or loosened for any reason so that the foot lever reaches let us say three-quarters of its total movement, then the lever will contact with the arm and the abnormal or safety operation commences and the band is rapidly contracted. During the normal movement the leverage will ordinarily be such as to permit an easy application of the brakes. During the abnormal movement, of course it will require more force to apply the brake. But this is not a disadvantage since the operator has abundant power to set the brakes, and the tendency of every driver is to set the brakes hard when in danger. The emergency feature has the further advantage that in normal use, when the band is worn to the extent that the brake sets hard, it is a warning to the driver to adjust the band. Nevertheless, the contraction of the band may be made so rapid that it will require a great amount of wear before the emergency feature reaches the end of its capacity.

Figure 2:
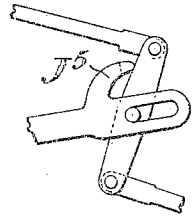
Fig. 2 is a similar view applied to an expanding brake.

In Fig. 2 I have shown the invention as applied to an expanding brake. The principle of operation is the same. The constructions are similar except that the arm $J^5$ is arranged on the opposite side of the lever.

It will be understood that Figs. 1 and 2 are illustrative only and that various constructions may be adopted to secure the same results.

Figure 3:
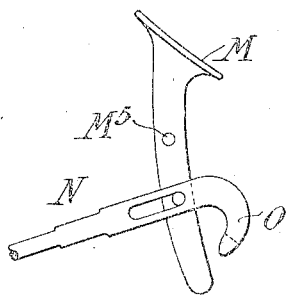
Fig. 3 is a view showing the application of this form of the invention to a foot lever.

In Fig. 3 I have shown a foot lever M pivoted to the car at $M^5$ which is connected with any suitable pull rod N for operating the brake rods, the end of which rod is provided with an arm O adapted to make contact with the end of the pedal so as to increase the leverage in a manner similar to that shown in Figs. 1 and 2. The same device may be applied at other points in the braking system.

What I claim is:

1. In a vehicle brake, a shoe, an operating member having a limited range of movement from one extreme to the other, such total movement being divided into two parts, means controlled by said operating member for advancing said shoe toward the wheel to be braked, said means operating during the first part of said movement to advance said shoe at a substantially definite and uniform rate per inch of movement of said operating member and means effective during the second part of said movement, to change the coöperative relations between said shoe and its advancing means so as to cause said shoe to be advanced at a rate per inch of movement of said operating member which is largely in excess of the rate of advance during such first part.

2. In a vehicle brake, a shoe, an operating member having a limited range of movement from one extreme to the other, such total movement being divided into two parts, means controlled by said operating member for advancing said shoe toward the wheel to be braked, said means operating during the first part of said movement to advance said shoe at a substantially definite and uniform rate per inch of movement of said operating member and means effective during the second part of said movement to change the coöperative relations between said shoe and its advancing means so as to cause said shoe to be advanced at a rate per inch of movement of said operating member which is largely in excess of the rate of advance during such first part, said second rate of advance being substantially uniform.

3. In a vehicle brake, a shoe, an operating member having a limited range of movement from one extreme to the other, such total movement being divided into two parts, controlled by said operating member, means controlled by said operating member for advancing said shoe toward the wheel to be braked, said means operating during the first part of said movement to advance said shoe at a substantially definite and uniform rate per inch of movement of said operating member and means effective during the second part of said movement, to change the coöperative relations between said shoe and its advancing means so as to cause said shoe to be advanced at a rate per inch of movement of said operating member which is largely in excess of the rate of advance during such first part, said second rate of advance being substantially uniform, there being a substantially instantaneous change from one rate of advance to the other.

4. A brake mechanism comprising a braking element, an operating element, and means connecting said elements, the forms and relative arrangement of said connected parts being such that, throughout a portion of the extreme range of movement of said operating element, equal increments of movement thereof will effect normally varying degrees of effectiveness of said braking element and throughout the remaining portion, increments of movement thereof of like magnitude will effect abnormal degrees of effectiveness of said braking element of materially greater intensity.

5. A brake mechanism comprising a braking element, an operating element, and means connecting said elements, the forms and relative arrangement of said connected parts being such that throughout the major portion of the extreme range of movement of said operating element, equal increments of movement thereof will effect normally varying degrees of effectiveness of said braking element, and throughout the remaining portion, increments of movement thereof of like magnitude will effect abnormal degrees of effectiveness of said braking element of materially greater intensity.

6. The combination with an automobile brake band, of a lever having effective engagement with the band at different points so as to exert different leverages on the band at different points of its travel and thereby cause it to move at different speeds while said lever is actuated at a constant speed.

7. The combination with an automobile brake band, of a lever pivoted to one end and engaging the other end, and means for shifting the point of effective engagement of said lever with one of said ends.

8. The combination with an automobile brake band, of a lever pivoted to one end of the band, a part connected to the other end of the band and having a slot, a pivot on the lever engaging one end of the slot, and said part having a portion adapted to engage the lever at a point farther from said pivotal engagement than said slot upon an excessive movement of the lever.

9. In a vehicle brake a band shoe, an operating member therefor and means for tightening the band at a substantially uniform rate proportionate to the movement of the operating member while the band is unworn, and means, acting when the band is sufficiently worn, for greatly accelerating the rate of tightening in proportion to similar movements of the operating member.

In witness whereof, I have hereunto signed my name in the presence of two subscribing witnesses.

EUGENE V. MYERS.